US011719921B2

(12) United States Patent
Dai et al.

(10) Patent No.: US 11,719,921 B2
(45) Date of Patent: Aug. 8, 2023

(54) RAPID THREE-DIMENSIONAL IMAGING SYSTEM AND METHOD BASED ON MULTI-ANGLE 4PI MICROSCOPE, AND STORAGE MEDIUM

(71) Applicant: TSINGHUA UNIVERSITY, Beijing (CN)

(72) Inventors: Qionghai Dai, Beijing (CN); You Zhou, Beijing (CN); Jiamin Wu, Beijing (CN); Guoxun Zhang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 450 days.

(21) Appl. No.: 16/869,185

(22) Filed: May 7, 2020

(65) Prior Publication Data

US 2020/0393659 A1    Dec. 17, 2020

(30) Foreign Application Priority Data

Jun. 11, 2019   (CN) .......................... 201910503173.8

(51) Int. Cl.
| | | |
|---|---|---|
| G02B 21/00 | (2006.01) | |
| G02B 26/08 | (2006.01) | |
| G02B 26/10 | (2006.01) | |

(52) U.S. Cl.
CPC ....... G02B 21/0032 (2013.01); G02B 21/008 (2013.01); G02B 21/0036 (2013.01);
(Continued)

(58) Field of Classification Search
CPC ............ G02B 21/0032; G02B 21/0036; G02B 21/0076; G02B 21/008; G02B 26/0875;
(Continued)

(56) References Cited

U.S. PATENT DOCUMENTS

2009/0263002 A1* 10/2009 Cremer .................... G06T 5/20
382/133

FOREIGN PATENT DOCUMENTS

| CN | 107014793 A | * | 8/2017 | ............. G01N 21/01 |
| CN | 107014793 A | | 8/2017 | |

(Continued)

OTHER PUBLICATIONS

Office Action dated Mar. 19, 2020 for corresponding Chinese Application No. 201910503173.8.
(Continued)

*Primary Examiner* — Balram T Parbadia
*Assistant Examiner* — Rahman Abdur
(74) *Attorney, Agent, or Firm* — David D. Brush; Westman, Champlin & Koehler, P.A.

(57) ABSTRACT

The present disclosure provides a rapid three-dimensional imaging system based on a multi-angle 4Pi microscope. The system includes: an illumination module, configured to obtain a parallel light of which a size covering a projection surface of a spatial light modulator; a wavefront modulation module, configured to place the LCOS device on a Fourier plane of an illumination end; a two-dimensional scanning module, configured to control a light beam to realize a two-dimensional scanning on an object plane; an illumination interference module, configured to generate point spread function PSFs of a 4Pi through an illumination interference to irradiate a fluorescent sample; an imaging module, configured to acquire interference images of two fluorescent signals; and a controller, configured to control the wavefront modulation module to adjust a polarization direction of the light to generate PSFs of the 4Pi with different inclination angles.

7 Claims, 4 Drawing Sheets

(52) U.S. Cl.
CPC ..... *G02B 21/0076* (2013.01); *G02B 26/0875* (2013.01); *G02B 26/101* (2013.01)

(58) Field of Classification Search
CPC .. G02B 26/101; G02B 27/58; G02B 21/0028; G02B 21/0068; G02B 21/367
USPC ...................................................... 359/210.1
See application file for complete search history.

(56) References Cited

FOREIGN PATENT DOCUMENTS

| | | | | |
|---|---|---|---|---|
| CN | 109633885 A | * | 4/2019 | ......... G02B 21/0092 |
| CN | 109633885 A | | 4/2019 | |

OTHER PUBLICATIONS

English translation of the Office Action dated Mar. 19, 2020 for corresponding Chinese Application No. 201910503173.8.

* cited by examiner

RAPID THREE-DIMENSIONAL IMAGING SYSTEM AND METHOD BASED ON MULTI-ANGLE 4PI MICROSCOPE, AND STORAGE MEDIUM

CROSS-REFERENCE TO RELATED APPLICATION

The present application is based upon and claims priority to Chinese Patent Application No. 201910503173.8, filed on Jun. 11, 2019, the entirety contents of which are incorporated herein by reference.

FIELD

The present disclosure relates to a field of microscopic imaging technology, and more particularly, to a rapid three-dimensional imaging system and method based on a multi-angle 4Pi microscope and a non-transitory computer-readable storage medium.

BACKGROUND

In the field of microscopic imaging, a realization of rapid three-dimensional living body imaging is a currently frontier issue. A light field microscopy technology can realize a real-time three-dimensional imaging by sacrificing a certain spatial resolution, and is widely used for researching problems of zebrafish embryonic development and the like.

However, how to obtain an imaging quality with a higher resolution (both in lateral and axial directions) is a problem to be solved. In addition, in a fluorescence imaging, because of problems including photobleaching, phototoxicity and the like, an intensity of a fluorescence signal is limited, and how to obtain a fluorescence image with a higher signal-to-noise ratio is an important research direction.

SUMMARY

The present disclosure aims to solve at least one of the technical problems in the related art to at least some extent.

Embodiments of the present disclosure provide a rapid three-dimensional imaging system based on the multi-angle 4Pi microscope the system includes: an illumination module, configured to obtain a parallel light of which a size covering a projection surface of a spatial light modulator including a LCOS device through a laser light; a wavefront modulation module, configured to place the LCOS device on a Fourier plane of an illumination end and to perform a wavefront modulation on the parallel light by projecting an intensity pattern; a two-dimensional scanning module, configured to control a light beam to realize a two-dimensional scanning on an object plane; an illumination interference module, configured to generate point spread function PSFs of a 4Pi through an illumination interference to irradiate a fluorescent sample; an imaging module, configured to acquire interference images of two fluorescent signals; and a controller, configured to control the wavefront modulation module to adjust a polarization direction of the light to generate PSFs of the 4Pi with different inclination angles, to obtain a plurality of interference images and to obtain a three-dimensional imaging result according to the plurality of interference images.

Embodiments of the present disclosure provide a rapid three-dimensional imaging method based on the multi-angle 4Pi microscope. The method includes: obtaining a parallel light of which a size covering a projection surface of a spatial light modulator including a LCOS device through a laser light; placing the spatial light modulator including the LCOS device on a Fourier plane of an illumination end and performing a wavefront modulation on the parallel light by projecting an intensity pattern, and controlling a light beam to realize a two-dimensional scanning on an object plane; generating point spread function PSFs of a 4Pi through an illumination interference to irradiate a fluorescent sample, and acquiring interference images of two fluorescent signals; and adjusting a polarization direction of the light to generate PSFs of the 4Pi with different inclination angles, obtaining a plurality of interference images and obtaining a three-dimensional imaging result according to the plurality of interference images.

Embodiments of the present disclosure provide a non-transitory computer-readable storage medium having stored therein instructions that, when executed by a processor of a device, cause the processor to perform a rapid three-dimensional imaging method based on a multi-angle 4Pi microscope, the method including: obtaining a parallel light of which a size covering a projection surface of a spatial light modulator including a LCOS device through a laser light; placing the spatial light modulator including the LCOS device on a Fourier plane of an illumination end and performing a wavefront modulation on the parallel light by projecting an intensity pattern, and controlling a light beam to realize a two-dimensional scanning on an object plane; generating point spread function PSFs of a 4Pi through an illumination interference to irradiate a fluorescent sample, and collecting interference images of two fluorescent signals; and adjusting a polarization direction of the light to generate PSFs of the 4Pi with different inclination angles, obtaining a plurality of interference images and obtaining a three-dimensional imaging result according to the plurality of interference images.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
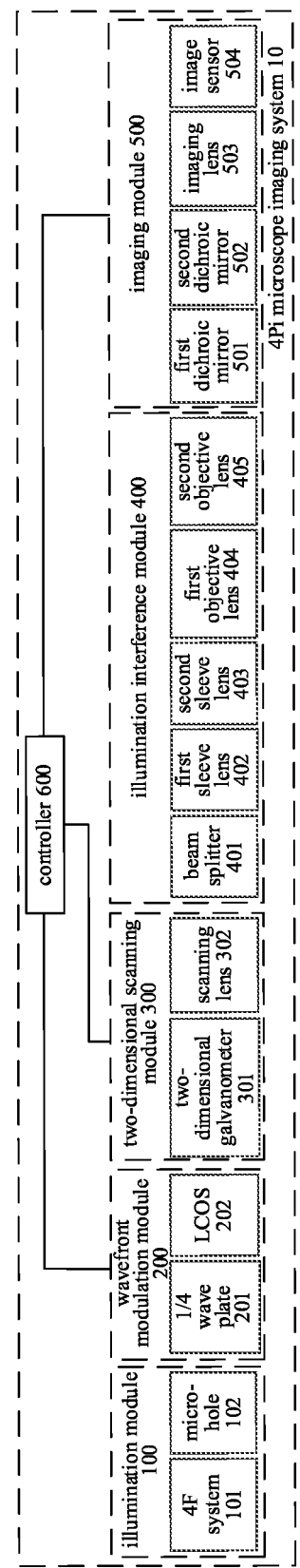
FIG. 1 is a block diagram of a rapid three-dimensional imaging system based on a multi-angle 4Pi microscope according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. Embodiments described herein with reference to drawings are explanatory, serve to explain the present disclosure, and are not construed to limit embodiments of the present disclosure.

The present disclosure is based on recognition and discovery by the inventor of the following problems.

Due to a development of spatial light modulators such as a DMD (Digital Micromirror Device), an LCOS (Liquid Crystal on Silicon, Silicon-based Liquid Crystal display) and a DM (Deformation mirror), a wavefront modulation is performed on a Fourier plane of an illumination end or an acquisition end, which is a common mean for improving a performance of a microscopic imaging. In an adaptive light filed, the method may be used for eliminating a system error and an aberration of an optical device and for improving an imaging intensity and a resolution. The wavefront modulation, as a widely adopted technical, is helpful for editing of a light point-spread function (PSF) is realized through, such that a special imaging purpose may be achieved. For example, an intensity modulation is achieved by placing a ring at the illumination end, a Bessel beam is generated, an axial elongation of the light PSF is achieved, and the like.

The rapid three-dimensional imaging system and method based on the multi-angle 4Pi microscope according to embodiments of the present disclosure will be described below with reference to the accompanying drawings. Firstly, the rapid three-dimensional imaging system based on the multi-angle 4Pi microscope according to embodiments of the present disclosure will be described below with reference to the accompanying drawings.

FIG. 1 is a block diagram of the rapid three-dimensional imaging system based on the multi-angle 4Pi microscope according to an embodiment of the present disclosure.

As illustrated in FIG. 1, the rapid three-dimensional imaging system 10 based on the multi-angle 4Pi microscope includes: an illumination module 100, a wavefront modulation module 200, a two-dimensional scanning module 300, an illumination interference module 400, an imaging module 500, and a controller 600.

The illumination module 100 is configured to obtain a parallel light of which a size covering a projection surface of a spatial light modulator including a LCOS device through a laser light. The wavefront modulation module 200 is configured to place the LCOS device on a Fourier plane of an illumination end and to perform a wavefront modulation on the parallel light by projecting an intensity pattern. The two-dimensional scanning module 300 is configured to control a light beam to realize a two-dimensional scanning on an object plane. The illumination interference module 400 is configured to generate point spread function PSFs of a 4Pi through an illumination interference to irradiate a fluorescent sample. The imaging module 500 is configured to collect interference images of two fluorescent signals. The controller 600 is configured to control the wavefront modulation module to adjust a polarization direction of the light to generate PSFs of the 4Pi with different inclination angles, to obtain a plurality of interference images and to obtain a three-dimensional imaging result according to the plurality of interference images. The system 10 of the embodiment of the present disclosure is capable to realize a rapid imaging of a living body sample.

It will be appreciated that the system 10 of the embodiment of the present disclosure may also be referred to as a 4Pi imaging system, in which an intensity pattern is projected through an LCOS device, an illumination wavefront of the 4Pi imaging system is modulated, and desired PSFs of the multi-angle 4Pi are produced. With a two-dimensional galvanometer, a transverse scanning of the light is realized, and an excitation and a collection are carried out on a sample surface. According to the embodiment of the present disclosure, an illumination PSF of the 4Pi imaging system is modulated through a series of optimally designed intensity patterns, such that an axial elongation and a multi-angle rotation are realized, and an imaging depth of field is expanded; and combining with a related reconstruction algorithm, data collected for many times are synthesized, and a three-dimensional high-resolution object imaging of a fluorescent object.

Specifically, according to the system 10 of embodiments of the present disclosure, super-resolution PSFs of the 4Pi with different inclination angles may be generated by using double objective lenses in cooperation with the wavefront modulation, and then three-dimensional information of the sample is reconstructed through a tomography method. As illustrated in FIG. 1, the illumination module 100 may adopt a light source of 488 nm, and after a collimation and a beam expansion, the parallel light with a size just covering a modulation surface of an LCOS device 202. The wavefront modulation module 200 mainly includes a ¼ wave plate 201 and the LCOS device 202, in which the LCOS device 202 is placed on the Fourier plane of the illumination end, and the wavefront modulation is performed on the parallel light by projecting the intensity pattern. The two-dimensional scanning module 300 mainly includes a two-dimensional galvanometer system 301 and a scanning lens 302, and is configured to realize a two-dimensional scanning of the light beam on the object plane. The illumination interference module 400 mainly includes two sleeve lenses 402 and 403, and two objective lenses 404 and 405 placed opposite to each other, to form interfering PSFs of the 4Pi for irradiating the fluorescent sample. The imaging module 500 mainly includes two dichroic mirrors 501 and 502, an imaging lens 503 and an image sensor 504, and is configured to collect the interference images for the two fluorescence signals. The controller 600 synchronously controls the intensity pattern projection on the LCOS device 202, the two-dimensional scanning of the galvanometer 301, and the image collection of the image sensor 504, so as to sample fluorescence information of the sample.

The system 10 will be further described with reference to FIG. 2.

Figure 2:
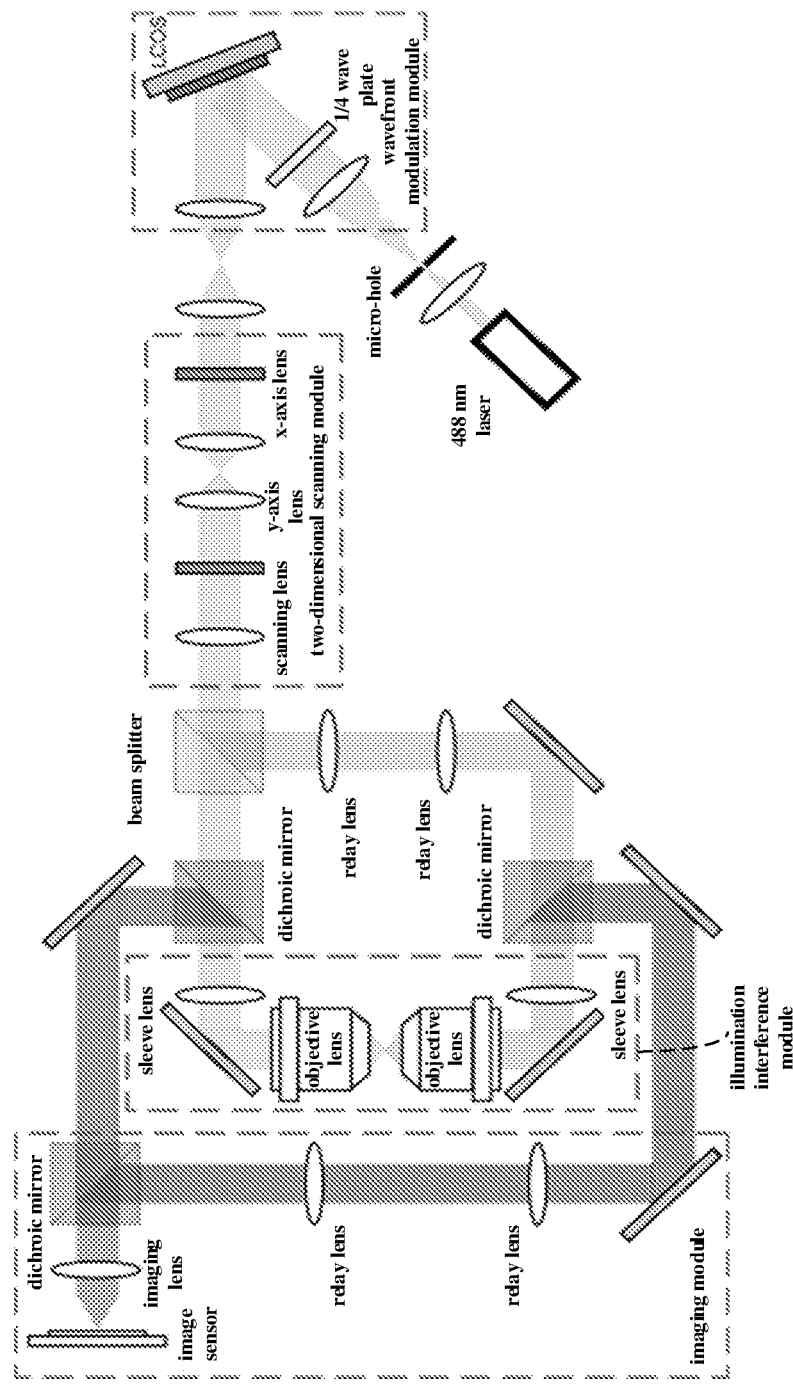
FIG. 2 is a structural diagram of a rapid three-dimensional imaging system based on a multi-angle 4Pi microscope according to an embodiment of the present disclosure.

Further, in an embodiment of the present disclosure, as illustrated in FIG. 2, the illumination module 100 is also configured to control the laser light to pass through the 5-time amplified 4F system 101, and to generate the circular hole 102 of 20 μm on the Fourier plane of the 4F system to realize a spatial filtering and a beam expanding and generate the parallel light with proper size.

Further, in an embodiment of the present disclosure, as illustrated in FIG. 2, in the wavefront modulation module 200, the polarization direction of the light is adjusted by rotating the ¼ wave plate 201 to match with the LCOS device 202, an intensity pattern for modulating the wavefront is displayed on a screen of the LCOS device 202, and then the modulated light is projected onto the two-dimensional galvanometer 301 by a rear-stage 4F system. A plurality of intensity images are sequentially projected on the Fourier plane of the illumination end through the LCOS, a same modulation of two paths of the light is simultaneously realized, and the two paths of light generate an axial multi-point excitation on a three-dimensional sample after an interference through two oppositely-arranged objective lenses.

Further, in an embodiment of the present disclosure, as illustrated in FIG. 2, in the two-dimensional scanning module 300, the scanning lens 302 is specially designed to match with the rear-stage light path to reduce the scanning error of the two-dimensional galvanometer 301, and to combine with rear-stage sleeve lenses 402 and 403 to form the 4F system to adjust the size of the light beam to the target size.

Further, in an embodiment of the present disclosure, as illustrated in FIG. 2, in the illumination interference module 400, firstly, the light is divided into two paths by a beam splitter 401, and two opposite light beams are generated through two objective lenses 404 and 405 and the two sleeve lenses 402 and 403 matching with the objective lenses, so as to obtain the PSFs of the 4Pi through the illumination interference and irradiate the fluorescent sample according to the PSFs. One path of the light beams uses the reflecting mirror and the other one path of the light beams uses two reflecting mirrors, such that the PSFs forming the light beams are symmetric along one dimension on a transverse plane perpendicular to an optical axis.

Further, in an embodiment of the present disclosure, as illustrated in FIG. 2, in the imaging module 500, the two dichroic mirrors 501 and 502 are respectively disposed in the two paths of light, an excitation light source and a signal of fluorescence are split, so that the two paths of light are converged at an collection end and generate the interference again, and finally, an image is collected through the imaging lens 503 and the image sensor 504.

Figure 3:
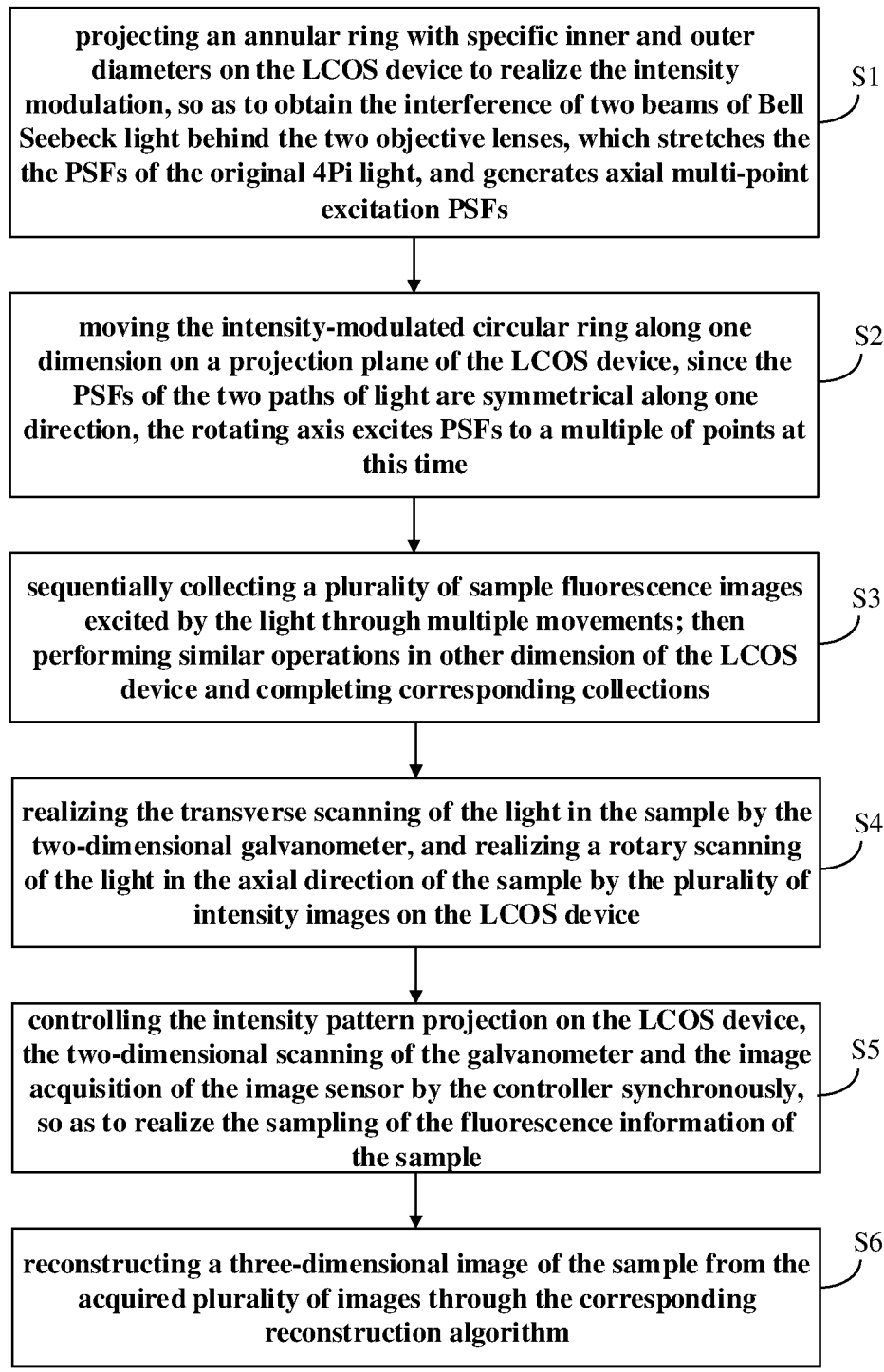
FIG. 3 is a flow diagram of a principle of a rapid three-dimensional imaging system based on a multi-angle 4Pi microscope according to an embodiment of the present disclosure.

The principle of the system 10 will be described with reference to FIG. 3.

At block S1, an annular ring with specific inner and outer diameters is projected on the LCOS device 202 to realize the intensity modulation, such that the interference of two beams of Bell Seebeck light is obtained behind the two objective lenses 404 and 405, the depth of field of the PSFs of a traditional 4Pi system is expanded, and axial multi-point excitation PSFs of the 4Pi are generated.

At block S2, the intensity-modulated circular ring is moved along one dimension on a projection plane of the LCOS device 202, since the PSFs of the two paths of light are symmetrical along one direction, the rotating axis may excite PSFs to a multiple of points at this time.

At block S3, a plurality of sample fluorescence images excited by the light through multiple movements are sequentially collected; similar operations are then performed in other dimension of the LCOS device 202 and corresponding collections are completed.

At block S4, the transverse scanning of the light is realized in the sample by the two-dimensional galvanometer 301, and a rotary scanning of the light in the axial direction of the sample is realized by the plurality of intensity images on the LCOS device 202.

At block S5, the intensity patterns projection on the LCOS device 202, the two-dimensional scanning of the galvanometer 301 and the image collection of the image sensor 504 are controlled by the controller 600 synchronously, so as to realize the sampling of the fluorescence information of the sample.

At block S6, a three-dimensional image of the sample is reconstructed from the collected plurality of images through the corresponding reconstruction algorithm.

It should be noted that the multi-point simultaneous excitation may obtain a larger imaging signal-to-noise ratio and a higher time resolution; moreover, due to inherent characteristics of axial information of the sample, a limited axially rotating excitation may be sparsely performed, and the three-dimensional imaging of the living body sample is realized.

With the rapid three-dimensional imaging system based on the multi-angle 4Pi microscope provided by embodiments of the present disclosure, the axial multi-point simultaneous excitation of the sample is realized by utilizing the wavefront intensity modulation of the light, and the signal-to-noise ratio of the fluorescence imaging may be improved; by combining the sparse collection and the corresponding reconstruction algorithm, the rapid three-dimensional imaging of the living body sample may be realized.

Figure 4:
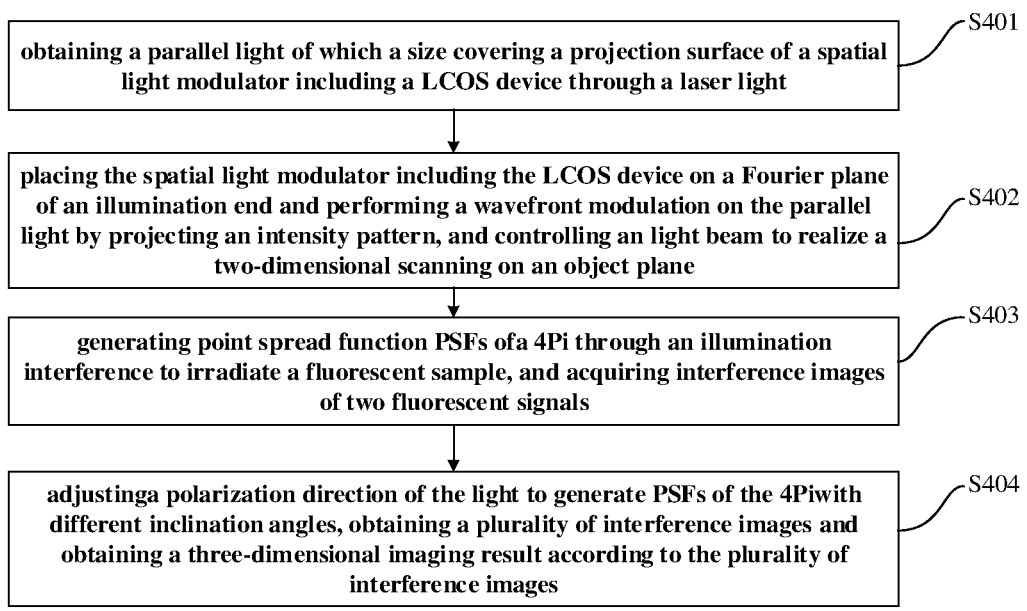
FIG. 4 is a flow diagram of a rapid three-dimensional imaging method based on a multi-angle 4Pi microscope according to an embodiment of the present disclosure.

Secondly, the rapid three-dimensional imaging method based on the multi-angle 4Pi microscope according to embodiments of the present disclosure will be described below with reference to the accompanying drawings, FIG. 4 is a flow diagram of a rapid three-dimensional imaging method based on a multi-angle 4Pi microscope according to an embodiment of the present disclosure.

As illustrated in FIG. 4, the method includes followings.

At block S401, a parallel light of which a size covering a projection surface of a spatial light modulator including a LCOS device is obtained through a laser light.

At block S402, the spatial light modulator including the LCOS device is placed on a Fourier plane of an illumination end and a wavefront modulation is performed on the parallel light by projecting an intensity pattern, and a light beam is controlled to realize a two-dimensional scanning on an object plane.

At block S403, PSFs of a 4Pi are generated through an illumination interference to irradiate a fluorescent sample, and interference images of two fluorescent signals are collected.

At block S404, a polarization direction of the light is adjusted to generate PSFs of the 4Pi with different inclination angles, a plurality of interference images are obtained and a three-dimensional imaging result is obtained according to the plurality of interference images.

Further, in an embodiment of the present disclosure, obtaining the parallel light of which the size covering a projection surface of the spatial light modulator including the LCOS device through the laser light includes: controlling the laser light to pass through a 5-time amplified 4F system, and generating a circular hole of 20 μm on the Fourier plane of the 4F system to obtain the parallel light.

Further, in an embodiment of the present disclosure, the method further includes: reducing a scanning error of the two-dimensional galvanometer by a scanning lens matching with a rear-stage light path, and combining with a rear-stage sleeve lens to form a 4F system to adjust a size of the light beam to a target size.

Further, in an embodiment of the present disclosure, generating PSFs of the 4Pi through the illumination interference includes: dividing the light into two paths by a front-stage beam splitter, and generating two opposite light beams through two objective lenses and two sleeve lenses matching with the objective lenses, so as to obtain the PSFs of the 4Pi through the illumination interference and irradiate the fluorescent sample according to the PSFs, in which, one of the light beams uses a reflecting mirror and the other one of the light beams uses two reflecting mirrors, such that the PSFs forming the light beams are symmetric along one dimension on a transverse plane perpendicular to an optical axis.

It should be noted that, the above explanation of embodiments of the rapid three-dimensional imaging system based on the multi-angle 4Pi microscope is also applicable to the embodiments of the rapid three-dimensional imaging system based on the multi-angle 4Pi microscope, which is not elaborated here.

With the rapid three-dimensional imaging method based on the multi-angle 4Pi microscope provided by embodiments of the present disclosure, the axial multi-point simultaneous excitation of the sample is realized by utilizing the intensity modulation of an illumination wavefront, and the signal-to-noise ratio of the fluorescence imaging may be improved; by combining the sparse acquisition and the corresponding reconstruction algorithm, the rapid three-dimensional imaging of the living body sample may be realized.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means at least two, for example, two or three, unless specified otherwise.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

Although embodiments of present disclosure have been shown and described above, it should be understood that above embodiments are just explanatory, and cannot be construed to limit the present disclosure, for those skilled in the art, changes, modifications, alternatives, and variations can be made to the embodiments within the scope of the present disclosure.

What is claimed is:

1. A rapid three-dimensional imaging system based on a multi-angle 4Pi microscope, comprising:
    an illumination module, configured to obtain a parallel light having a size covering a projection surface of a spatial light modulator including a liquid crystal on silicon (LCOS) device through a laser light;
    a wavefront modulation module, configured to place the LCOS device on a Fourier plane of an illumination end and to perform a wavefront modulation on the parallel light by projecting an intensity pattern;
    a two-dimensional scanning module, configured to control a light beam to realize a two-dimensional scanning on an object plane;
    an illumination interference module, configured to divide the light into two paths by a front-stage beam splitter, and to generate two opposite light beams through two objective lenses and two sleeve lenses matching with the objective lenses, to generate point spread functions (PSFs) of a 4Pi through an illumination interference to irradiate a fluorescent sample;
    an imaging module, configured to acquire interference images of two fluorescent signals; and
    a controller, configured to control the wavefront modulation module to adjust a polarization direction of the light to generate PSFs of the 4Pi with different inclination angles, to obtain a plurality of interference images and to obtain a three-dimensional imaging result according to the plurality of interference images;
    wherein the two-dimensional scanning module comprises a two-dimensional galvanometer and a scanning lens, in which the scanning lens is configured to match with a rear-stage light path to reduce a scanning error of the two-dimensional galvanometer, to combine with a rear-stage sleeve lens to form a 4F system to adjust a size of the light beam to a target size; and one of the light beams uses a reflecting mirror and the other one of the light beams uses two reflecting mirrors to allow the PSFs forming the light beams to be symmetric along one dimension on a transverse plane perpendicular to an optical axis.

2. The system of claim 1, wherein the illumination module is configured to control the laser light to pass through a 5-time amplified 4F system, and to generate a circular hole of 20 μm on the Fourier plane of the 4F system to obtain the parallel light.

3. The system of claim 1, wherein the wavefront modulation module comprises:
    a ¼ wave plate, configured to adjust the polarization direction of the light; and
    the LCOS device, configured to project the intensity pattern.

4. A rapid three-dimensional imaging method using a rapid three-dimensional imaging system based on a multi-angle 4Pi microscope, comprising:
    obtaining, by an illumination module, a parallel light having a size covering a projection surface of a spatial light modulator including a liquid crystal on silicon (LCOS) device through a laser light;
    placing, by a wavefront modulation module, the spatial light modulator including the LCOS device on a Fourier plane of an illumination end and performing a wavefront modulation on the parallel light by projecting an intensity pattern;
    controlling, by a two-dimensional scanning module, a light beam to realize a two-dimensional scanning on an object plane;
    dividing, by an illumination interference module, the light into two paths by a front-stage beam splitter, and to generate two opposite light beams through two objective lenses and two sleeve lenses matching with the objective lenses, to generate point spread functions (PSFs) of a 4Pi through an illumination interference to irradiate a fluorescent sample;
    collecting, by an imaging module, interference images of two fluorescent signals; and
    controlling the wavefront modulation module by a controller to adjust a polarization direction of the light to generate PSFs of the 4Pi with different inclination angles, obtaining a plurality of interference images and obtaining a three-dimensional imaging result according to the plurality of interference images;
    wherein the two-dimensional scanning module comprises a two-dimensional galvanometer and a scanning lens, in which the scanning lens is configured to match with a rear-stage light path to reduce a scanning error of the two-dimensional galvanometer, to combine with a rear-stage sleeve lens to form a 4F system to adjust a size of the light beam to a target size; and one of the light beams uses a reflecting mirror and the other one of the light beams uses two reflecting mirrors to allow the PSFs forming the light beams to be symmetric along one dimension on a transverse plane perpendicular to an optical axis.

5. The method of claim 4, wherein obtaining the parallel light of which the size covering a projection surface of the spatial light modulator including the LCOS device through the laser light comprises:

controlling the laser light to pass through a 5-time amplified 4F system, and generating a circular hole of 20 μm on the Fourier plane of the 4F system to obtain the parallel light.

6. The method of claim 4, wherein generating PSFs of the 4Pi through the illumination interference comprises:

dividing the light into two paths by a front-stage beam splitter, and generating two opposite light beams through two objective lenses and two sleeve lenses matching with the objective lenses, so as to obtain the PSFs of the 4Pi through the illumination interference and irradiate the fluorescent sample according to the PSFs, in which, one of the light beams uses a reflecting mirror and the other one of the light beams uses two reflecting mirrors to allow the PSFs forming the light beams are symmetric along one dimension on a transverse plane perpendicular to an optical axis.

7. A non-transitory computer-readable storage medium having stored therein instructions that, when executed by a processor of a device, cause the processor to perform a rapid three-dimensional imaging method using a rapid three-dimensional imaging system based on a multi-angle 4Pi microscope, the method comprising:

obtaining, by an illumination module, a parallel light having a size covering a projection surface of a spatial light modulator including a liquid crystal on silicon (LCOS) device through a laser light;

placing, by a wavefront modulation module, the spatial light modulator including the LCOS device on a Fourier plane of an illumination end and performing a wavefront modulation on the parallel light by projecting an intensity pattern;

controlling, by a two-dimensional scanning module, a light beam to realize a two-dimensional scanning on an object plane;

dividing, by an illumination interference module, the light into two paths by a front-stage beam splitter, and to generate two opposite light beams through two objective lenses and two sleeve lenses matching with the objective lenses, to generate point spread functions (PSFs) of a 4Pi through an illumination interference to irradiate a fluorescent sample;

collecting, by an imaging module, interference images of two fluorescent signals; and controlling the wavefront modulation module by a controller to adjust a polarization direction of the light to generate PSFs of the 4Pi with different inclination angles, obtaining a plurality of interference images and obtaining a three-dimensional imaging result according to the plurality of interference images;

wherein the two-dimensional scanning module comprises a two-dimensional galvanometer and a scanning lens, in which the scanning lens is configured to match with a rear-stage light path to reduce a scanning error of the two-dimensional galvanometer, to combine with a rear-stage sleeve lens to form a 4F system to adjust a size of the light beam to a target size; and one of the light beams uses a reflecting mirror and the other one of the light beams uses two reflecting mirrors to allow the PSFs forming the light beams to be symmetric along one dimension on a transverse plane perpendicular to an optical axis.

* * * * *